April 5, 1932.  J. M. SKELTON  1,851,991
BUTTER CUTTER
Original Filed Oct. 20, 1930  2 Sheets-Sheet 2

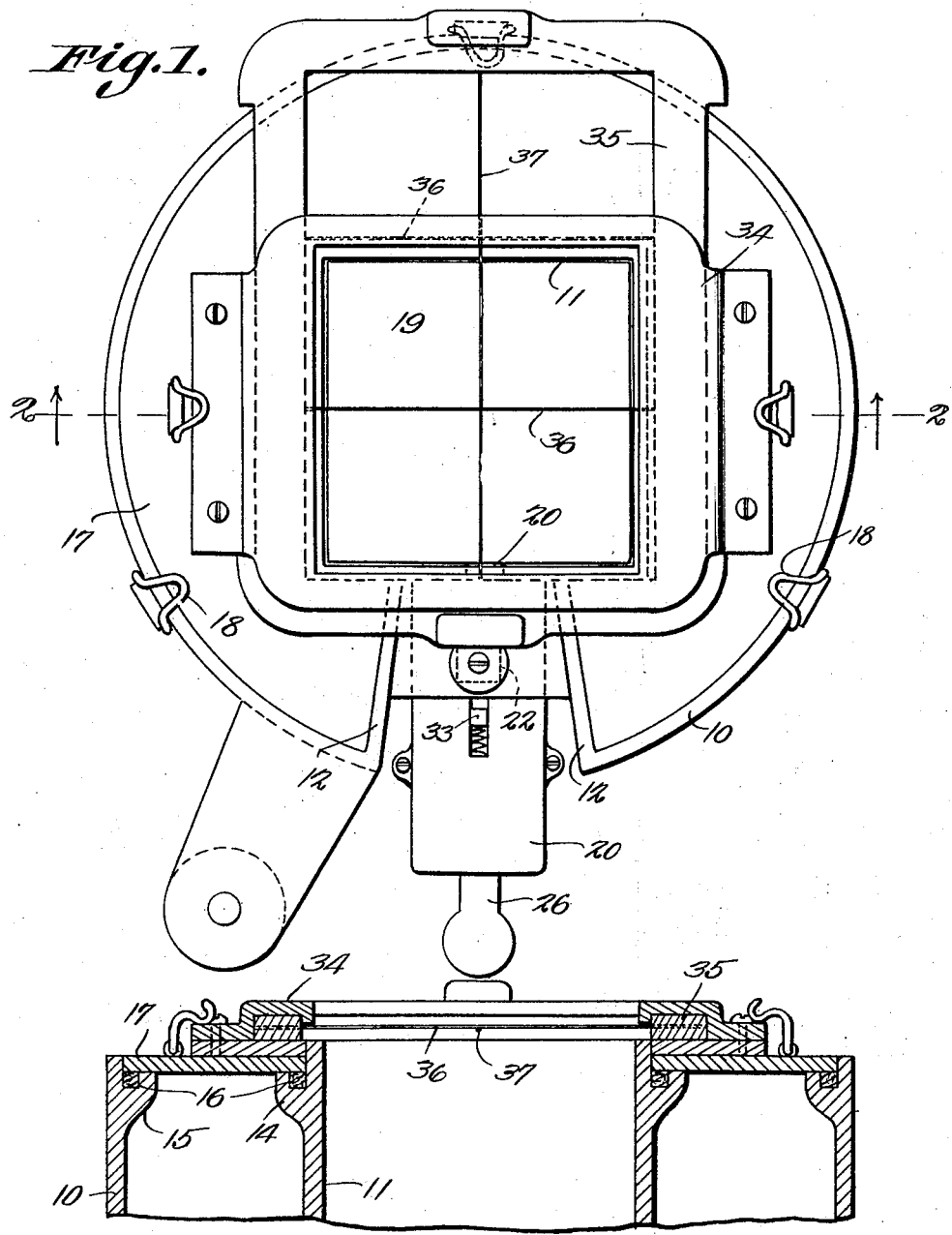

Inventor
Julian M. Skelton,
By E. Shelton Brewington.
Attorney

Patented Apr. 5, 1932

1,851,991

UNITED STATES PATENT OFFICE

JULIAN M. SKELTON, OF BALTIMORE, MARYLAND

BUTTER CUTTER

Application filed October 20, 1930, Serial No. 489,765. Renewed August 27, 1931.

This invention relates to dispensing devices and has special reference to a butter cutter and server.

One important object of the invention is to provide an improved general construction of devices of this character.

A second important object of the invention is to provide a device of this class having improved and novel means for feeding the butter into cutting position.

A third important object of the invention is to provide a novel and improved arrangement of the butter cutting mechanism in such a device.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:

Figure 1 is a plan view of the invention.

Figure 2 is a section through the upper part of the device on the line 2—2 of Figure 1.

Figure 3:
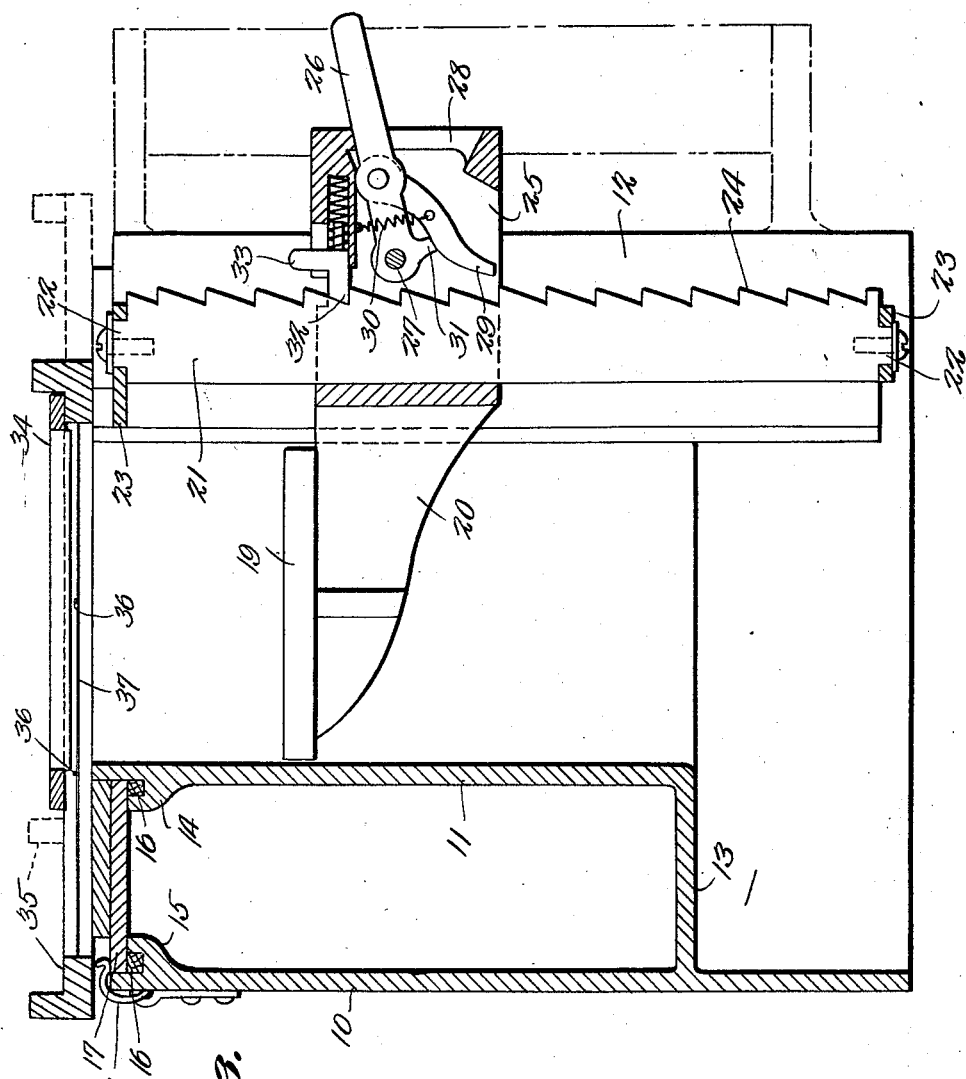
Figure 3 is a vertical section from top to bottom of the device and taken diametrically therethrough at right angles to Figure 2.

In the embodiment of the invention as here shown there is provided a substantially cylindrical outer casing 10 and a rectangular inner casing or butter holder 11. The cylindrical outer casing is interrupted at one side and, at the interrupted portion, is connected to the inner casing by radial walls 12. The inner casing terminates above the bottom of the outer casing and between the inner and outer casings is a bottom 13. At the upper edge the inner casing projects slightly above the outer casing and is provided with an external rib or flange 14, the outer casing being provided with a corresponding internal flange or rib 15, each rib being provided with an upwardly opening channel carrying packing 16. A cover plate 17 rests on these ribs and forms a cover for an ice compartment formed by the inner and outer casing walls and the bottom 13. Clips 18 detachably hold the cover 17 in position against accidental displacement.

A presser plate 19 is arranged horizontally in the inner casing 11. This plate or follower 19 is supported on a bracket 20 which extends into the gapped or interrupted portion of the casings and is vertically slotted to slide on a bar 21 having reduced ends 22 secured in cross bars 23 extending between the walls 12 at the top and bottom portions thereof. The outer edge of the bar 21 is provided with racket teeth 24 and in the slot 25 of the bracket 20 is a lever 26 pivoted on a pin 27. The handle of this lever extends outwardly of the bracket 20 through a slot 28. Pivoted to this lever intermediate its ends is a pawl or dog 29 normally held against a stop lug 31 on the lever by a spring 30 having one end attached to the pawl and the other end attached to the bracket in such manner that the spring not only holds the pawl against the lug but holds the lever raised. This lever and pawl form the operating means to raise the follower. A latching pawl 32 is slidably mounted in the slot 25 and is held normally in engagement with the teeth 24. This pawl 32 has a finger piece 33 projecting upwardly so that it may be grasped to pull the pawl out of engagement and thus to allow the follower 19 to move down in its casing. A guide housing 34 rests on the plate or cover 17 and carries an open rectangular cutter frame 35 which is slidable in said housing across the top of the inner casing or butter compartment. Transverse wires 36 stretch across this frame as does also a longitudinal wire 37. This frame slides so that, at one end of its movement one wire 36 extends across the center of the butter compartment and at the other end of its movement the other wire is in the same position.

In operation the housing 34 is lifted off and the cover 17 removed. The follower is positioned at its lowest point by releasing the latching pawl 32. The ice compartment is now filled with ice and its cover is applied. A pound of butter is now placed in the butter compartment, the latter being of proper size for the purpose, and the housing put on with the slide at one end. The lever 26 is now operated to raise the follower one tooth. This forces the butter up through the cutter, cutting the upper end into four pieces still attached to the main body of the butter. The cutter is now slid to the other end of its path cutting the four pieces off the block. This positions the cutter ready for dividing the next layer of the block. By repeating this operation, sliding the cutter first in one direction and then in the other, the block, or as much as may be desired, is cut in square parts of uniform size.

There has thus been provided a simple and efficient device of the kind described and for the purpose specified.

It is obvious that minor changes may be made in the form and construction of the device without departing from the principles involved. It is therefore desired to include, as the invention, all forms which properly come within the scope claimed.

Having thus described the invention, what is claimed is:—

1. In a butter cutter, a vertical butter compartment, a follower plate forming a bottom for said compartment and movable vertically therein, a step-by-step mechanism for raising said follower plate, a cutter frame slidable transversely over the upper end of said compartment, and butter dividing and severing wires carried by said frame.

2. In a butter cutter, a vertical butter compartment, a follower plate forming a bottom for said compartment and movable vertically therein, a step-by-step mechanism for raising said follower plate, a cutter frame slidable transversely over the upper end of said compartment, a pair of transverse cutter wires carried by said frame, said frame being movable to bring said wires selectively into central position over the center of the compartment, and a longitudinal cutter wire carried by said frame and intersecting the centers of the other wires.

3. In a butter cutter, a vertical butter compartment having a slot at one side, a follower plate forming a bottom for said compartment and movable vertically therein, a bracket extending out through said slot, a bar on which said bracket slides, said bar having ratchet teeth on one edge, an operating lever pivoted to said bracket, a pawl pivoted to said lever and engageable with said ratchet teeth to lift the bracket upon depression of the lever, a spring urging said pawl into tooth engaging position, a releasable latching pawl carried by said bracket and engaging said ratchet teeth, and butter cutting and severing means slidable transversely across the top of said compartment.

4. In a butter cutter, a vertical butter compartment having a slot at one side, a follower plate forming a bottom for said compartment and movable vertically therein, a bracket extending out through said slot, a bar on which said bracket slides, said bar having ratchet teeth on one edge, an operating lever pivoted to said bracket, a pawl pivoted to said lever and engageable with said ratchet teeth to lift the bracket upon depression of the lever, a spring urging said pawl into tooth engaging position, a releasable latching pawl carried by said bracket and engaging said ratchet teeth, a pair of transverse cutter wires carried by said frame, said frame being movable to bring said wires selectively into central position over the center of the compartment, and a longitudinal cutter wire carried by said frame and intersecting the centers of the other wires.

5. In a butter cutter, a vertical butter compartment having a slot at one side, a follower plate forming a bottom for said compartment and movable vertically therein, a bracket extending out through said slot, a bar on which said bracket slides, said bar having ratchet teeth on one edge, an operating lever pivoted to said bracket, a pawl pivoted to said lever and engageable with said ratchet teeth to lift the bracket upon depression of the lever, a spring urging said pawl into tooth engaging position, a releasable latching pawl carried by said bracket and engaging said ratchet teeth, butter cutting and severing means slidable transversely across the top of said compartment, and an ice compartment surrounding the greater part of the butter compartment.

6. In a butter cutter, a vertical butter compartment having a slot at one side, a follower plate forming a bottom for said compartment and movable vertically therein, a bracket extending out through said slot, a bar on which said bracket slides, said bar having ratchet teeth on one edge, an operating lever pivoted to said bracket, a pawl pivoted to said lever and engageable with said ratchet teeth to lift the bracket upon depression of the lever, a spring urging said pawl into tooth engaging position, a releasable latching pawl carried by said bracket and engaging said ratchet teeth, a pair of transverse cutter wires carried by said frame, said frame being movable to bring said wires selectively into central position over the center of the compartment, a longitudinal cutter wire carried by said frame and intersecting the centers of the other wires, and an ice compartment surrounding the greater part of the butter compartment.

In testimony whereof I affix my signature.

JULIAN M. SKELTON.